Patented Sept. 27, 1932

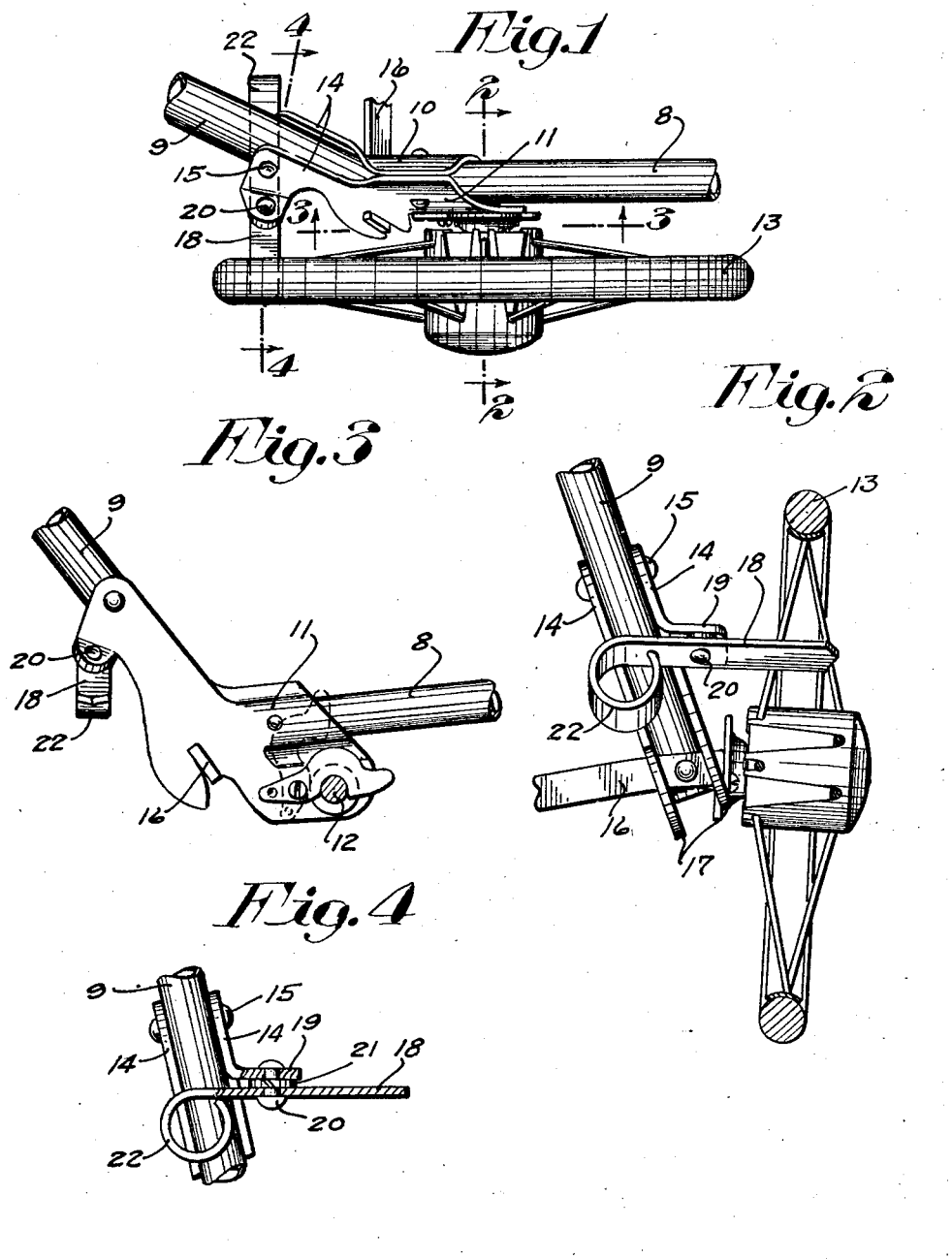

1,879,759

UNITED STATES PATENT OFFICE

JULIUS A. MAHR, OF MINNEAPOLIS, MINNESOTA, ASSIGNOR TO INVENTORS' PATENT HOLDING COMPANY, OF MINNEAPOLIS, MINNESOTA, A CORPORATION OF SOUTH DAKOTA

BRAKE FOR BABY CARRIAGES AND THE LIKE

Original application filed December 12, 1928, Serial No. 325,411. Divided and this application filed November 6, 1929. Serial No. 405,114.

My present invention has for its object the provision of an extremely simple and highly efficient brake intended for general use in connection with baby carriages and the like but especially well adapted for use in connection with a folding baby carriage of the type disclosed and broadly claimed in my copending application, filed December 12, 1928 under S. N. 325,411 of which the present application is a division.

To the above end, generally stated, the invention consists of the novel devices and combination of devices hereinafter described and defined in the claim.

In the accompanying drawing, which illustrates the invention, like characters indicate like parts throughout the several views.

Referring to the drawing:

Fig. 1 is a fragmentary plan view of a baby carriage chassis having the invention embodied therein;

Fig. 2 is a fragmentary view partly in rear elevation and partly in vertical section taken on the line 2—2 of Fig. 1;

Fig. 3 is a fragmentary view principally in right-side elevation with some parts sectioned on the line 3—3 of Fig. 1; and Fig. 4 is a detail view partly in rear elevation and partly in section taken on the irregular line 4—4 of Fig. 1.

For the purpose of showing the improved brake applied in working position there is illustrated in the drawing a fragment of the chassis of the folding baby carriage heretofore referred to. Of the parts of the baby carriage shown, the numeral 8 indicates the right side bar of its chassis and the numeral 9 indicates the rear body support comprising a pair of upwardly converging members pivotally connected at their upper ends, only a portion of one of said members being shown. This member of the body support 9 is attached to the side bar 8 by a coupling comprising inner and outer pressed metal members 10 and 11, respectively. Said coupling members 10 and 11 are rigidly connected by rivets to each other and to the side bar 8. Secured to the coupling members 10 and 11 is a spindle 12 on which is journaled a wheel 13 having wire spokes. On the rear end of the coupling members 10 and 11 is a pair of laterally spaced upstanding combined bearing and guide flanges 14 between which the respective member of the body support 9 extends and is pivoted thereto at 15 for folding movement longitudinal on the chassis.

Front and rear toggle-acting cross-tie bars 16, only the latter of which is shown, are provided for connecting the side bars 8 of the chassis and are pivoted at their outer ends to the members of the body supports 9, below their pivots 15 for buckling movements in vertical planes transversely of its chassis. When the cross-tie bars 16 are straight, their outer end portions are interlocked with reversely arranged hook-like lugs 17 on the rear ends of the coupling members 10 and 11 and are thereby held against lateral movement and in turn hold the body supports 9 against folding movement. The movement of the body supports 9 into operative positions is limited by the engagement of their lower end portions with the side bars 8 and coupling members 10 and 11.

This brake arm 18 extends under and is pivoted to a flat horizontal bearing lug 19 on the outer bearing and guide flange 14 and is pivoted thereto at 20 for swinging movement substantially in a plane that extends radially in respect to the axis of the wheel 13.

A spring washer 21 on the pivot 20 is compressed between the brake arm 18 and bearing lug 19 and frictionally and yieldingly holds the brake arm 18 in either an operative or inoperative position. On the inner end of the brake arm 18 is a finger piece 22 by which said arm may be operated to move the same to and from an operative position. In actual construction, there will be one of these brake arms 18 for each rear wheel 13.

Referring now in detail to the improved brake the same, as shown, is in the form of a brake arm 18 arranged to be set in an operative position in which it extends transversely between any one pair of the spokes in the wheel 13 and holds said wheel from turning.

What I claim is:

The combination with a chassis of the class described, of a brake arm formed from a normally straight bar pivoted intermediate of its ends to the body of the chassis for movement to and from an operative position in which one of its end portions projects transversely between two of the spokes of one of the wheels of the chassis, the other end portion of the arm being bent to form a finger piece, and a spring washer encircling the pivot for the arm and compressed between said arm and the body for frictionally holding the arms where positioned.

In testimony whereof I affix my signature.

JULIUS A. MAHR.